United States Patent
Kondo et al.

(10) Patent No.: US 8,428,430 B2
(45) Date of Patent: Apr. 23, 2013

(54) IMAGE PROCESSING SYSTEM, IMAGE PROCESSING METHOD, AND PROGRAM

(75) Inventors: Tetsujiro Kondo, Tokyo (JP); Yoshinori Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1174 days.

(21) Appl. No.: 12/107,305

(22) Filed: Apr. 22, 2008

(65) Prior Publication Data

US 2008/0278409 A1  Nov. 13, 2008

(30) Foreign Application Priority Data

May 8, 2007 (JP) ................................ 2007-123043

(51) Int. Cl.
- *H04N 9/80* (2006.01)
- *H04N 5/783* (2006.01)
- *H04N 5/917* (2006.01)
- *H04N 7/00* (2006.01)
- *G06F 3/041* (2006.01)
- *G06K 9/46* (2006.01)

(52) U.S. Cl.
USPC ........... 386/241; 386/328; 386/329; 386/344; 386/355; 345/173; 348/22; 382/233

(58) Field of Classification Search .................. 386/241, 386/328, 329, 355, E9.013, 344, E5.043; 345/1.1, 173; 348/22.1, E5.037, E5.0422, 348/E5.104; 382/233
See application file for complete search history.

(56) References Cited

U.S. PATENT DOCUMENTS

| 7,406,249 | B2 * | 7/2008 | Shirakawa et al. | 386/241 |
| 7,956,847 | B2 * | 6/2011 | Christie | 345/173 |
| 2003/0146981 | A1 * | 8/2003 | Bean et al. | 348/222.1 |
| 2006/0078294 | A1 * | 4/2006 | Haruki | 386/68 |
| 2006/0147121 | A1 * | 7/2006 | Maeda et al. | 382/233 |

FOREIGN PATENT DOCUMENTS

| JP | 11-175045 | 7/1999 |
| JP | 2003-280623 | 10/2003 |
| JP | 2003-309814 | 10/2003 |

OTHER PUBLICATIONS

Japanese Office Action issued Apr. 24, 2012, in Patent Application No. 2007-123043.

* cited by examiner

*Primary Examiner* — Thai Tran
*Assistant Examiner* — Syed Hasan
(74) *Attorney, Agent, or Firm* — Oblon, Spivak, McClelland, Maier & Neustadt, L.L.P.

(57) ABSTRACT

An image processing system for simultaneously displaying one or more images includes an obtaining unit, a playback unit, and a display control unit. The obtaining unit obtains an information presentation level specified by a viewer. The playback unit plays, at a predetermined playback speed, the one or more images recorded on a predetermined recording medium. The display control unit changes, in according with the information presentation level, an amount of information of the one or more images to be displayed on a predetermined display unit.

16 Claims, 12 Drawing Sheets

IMAGE PROCESSING SYSTEM, IMAGE PROCESSING METHOD, AND PROGRAM

CROSS REFERENCES TO RELATED APPLICATIONS

The present invention contains subject matter related to Japanese Patent Application JP 2007-123043 filed in the Japanese Patent Office on May 8, 2007, the entire contents of which are incorporated herein by reference.

BACKGROUND OF THE INVENTION

1. Field of the Invention

The present invention relates to image processing systems, image processing methods, and programs. More specifically, the present invention relates to an image processing system, an image processing method, and a program for permitting a sufficient amount of image information to be presented to viewers.

2. Description of the Related Art

Multi-display systems having a plurality of display devices arranged in the horizontal and vertical directions are known (see, for example, Japanese Unexamined Patent Application Publication No. 2003-280623). Such multi-display systems can display one image using all of the plurality of display devices or can allow each of the plurality of display devices to display an image different from one another.

SUMMARY OF THE INVENTION

However, capabilities of viewers receiving presented information vary between individuals. Some viewers feel that an amount of presented information is small in a method for displaying images for multi-display systems according to the related art.

More specifically, multi-display systems according to the related art can hardly present a satisfying amount of information to viewers demanding more information.

In view of such a circumstance, an embodiment of the present invention permits a sufficient amount of image information to be presented to viewers according to an information presentation level specified by the viewers.

An image processing system according to one embodiment of the present invention is an image processing system for simultaneously displaying one or more images. The image processing system includes obtaining means for obtaining an information presentation level specified by a viewer, playback means for playing, at a predetermined playback speed, the one or more images recorded on a predetermined recording medium, and display control means for changing, in accordance with the information presentation level, an amount of information of the one or more images to be displayed on predetermined display means.

The image processing system may be further provided with one or more display means, the number of which corresponds to the number of the images.

The image processing system may be further provided with combining means for combining the one or more images.

The image processing system may be further provided with extracting means for extracting an important frame of the images played by the playback means.

An information processing method according to another embodiment of the present invention is an information processing method for an information processing system that performs processing for simultaneously displaying one or more images. The information processing method includes the steps of obtaining an information presentation level specified by a viewer, and changing, in accordance with the information presentation level, an amount of information of the one or more images to be displayed on predetermined display means by playing, at a predetermined playback speed, the one or more images recorded on a predetermined recording medium.

A program according to still another embodiment of the present invention is a program for allowing a computer to execute processing for simultaneously displaying one or more images. The processing includes the steps of obtaining an information presentation level specified by a viewer, and changing, in accordance with the information presentation level, an amount of information of the one or more images to be displayed on predetermined display means by playing, at a predetermined playback speed, the one or more images recorded on a predetermined recording medium.

According to one embodiment of the present invention, an information presentation level specified by a viewer is obtained and one or more images recorded on a predetermined recording medium are played at a predetermined speed, whereby an amount of information of the one or more images to be displayed on predetermined display means is changed in accordance with the information presentation level.

According to one embodiment of the present invention, a sufficient amount of image information can be presented to viewers according to an information presentation level specified by the viewers.

DESCRIPTION OF THE PREFERRED EMBODIMENTS

Before describing embodiments of the present invention, the correspondence between the features of the present invention and the specific embodiments disclosed in the specification or the drawings is discussed below. This description is intended to assure that embodiments supporting the claimed invention are described in this specification or the drawings. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An image processing system according to one embodiment of the present invention is an image processing system (e.g., a multi-television system 1 shown in FIG. 1) for simultaneously displaying one or more images. The image processing system includes obtaining means (e.g., a viewer-instruction obtaining unit 21 shown in FIG. 2) for obtaining an information presentation level specified by a viewer, playback means (e.g., a record/playback unit 26 shown in FIG. 2) for playing, at a predetermined playback speed, the one or more images recorded on a predetermined recording medium, and display control means (e.g., a control unit 30 shown in FIG. 2) for changing, in accordance with the information presentation level, an amount of information of the one or more images to be displayed on predetermined display means.

The image processing system may be further provided with one or more display means (e.g., a display unit 29 shown in FIG. 2), the number of which corresponds to the number of the images.

The image processing system may be further provided with combining means (e.g., an image/audio combining unit 28 shown in FIG. 2) for combining the one or more images.

The image processing system may be further provided with extracting means (e.g., an information analyzing unit 27 shown in FIG. 2) for extracting an important frame of the images played by the playback means.

An information processing method according to another embodiment of the present invention is an information processing method for an information processing system that performs processing for simultaneously displaying one or more images. The information processing method includes the steps of obtaining an information presentation level specified by a viewer (e.g., STEP S11 shown in FIG. 8), and changing, in accordance with the information presentation level, an amount of information of the one or more images to be displayed on predetermined display means by playing, at a predetermined playback speed, the one or more images recorded on a predetermined recording medium (e.g., STEPs S14 to S18 shown in FIG. 8).

Embodiments of the present invention will be described below with reference to the accompanying drawings.

Figure 1:
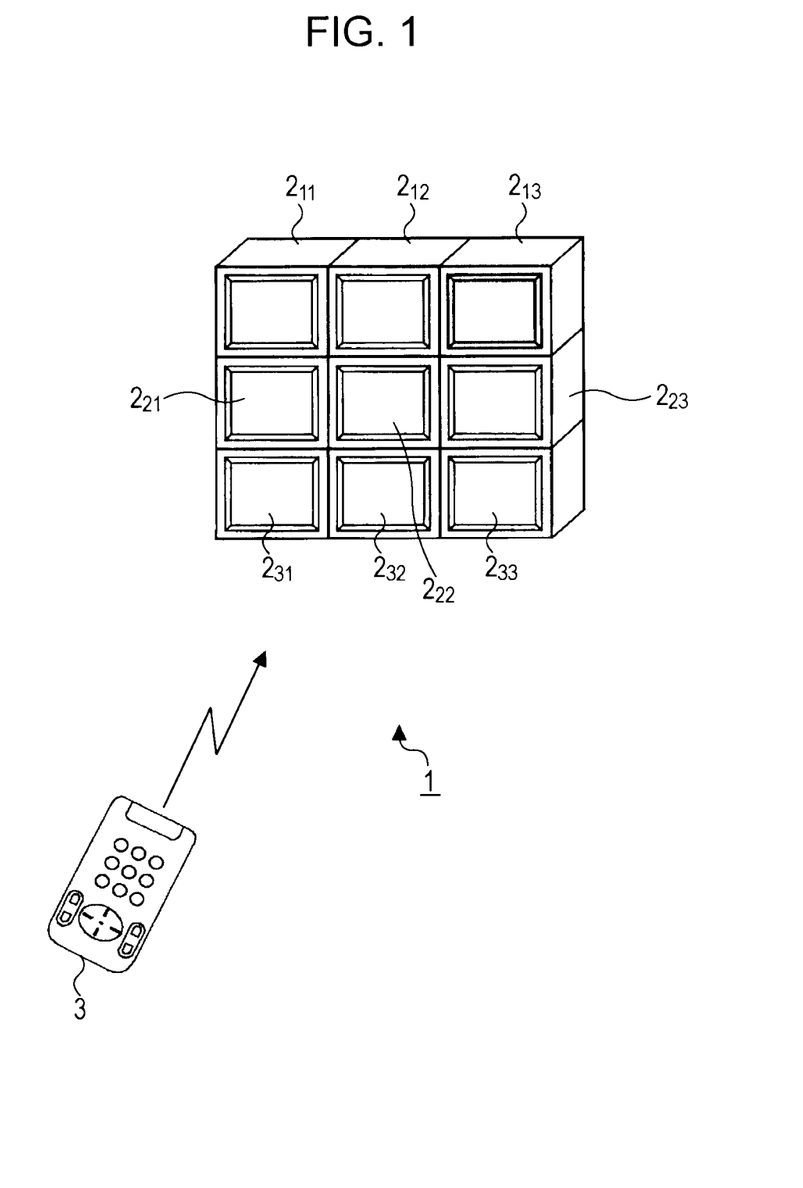
FIG. 1 is a diagram showing an example of a configuration of a multi-television system according to an embodiment of the present invention.

FIG. 1 shows an example of a configuration of a multi-television system corresponding to an image processing system according to an embodiment of the present invention. Here, a system indicates an entity to which a plurality of devices are logically collected and whether or not the devices having each configuration are included in an identical housing does not matter.

A multi-television system 1 shown in FIG. 1 includes nine television sets $2_{11}$, $2_{12}$, $2_{13}$, $2_{21}$, $2_{22}$, $2_{23}$, $2_{31}$, $2_{32}$, and $2_{33}$ and a remote commander 3 for use in operations of the television sets. As shown in FIG. 1, a description is given for the multi-television system 1 having television sets arranged in a 3×3 matrix in this embodiment. However, the multi-television system can include a given number of television sets. In addition, the numbers of the vertically and horizontally arranged television sets are not limited to an identical number.

When the television sets (hereinafter, appropriately referred to as TVs) $2_{11}$, $2_{12}$, $2_{13}$, $2_{21}$, $2_{22}$, $2_{23}$, $2_{31}$, $2_{32}$, and $2_{33}$ do not have to be particularly distinguished from one another, the television sets are referred to as television sets 2 (TVs 2) below. In addition, the remote commander 3 is simply referred to as a remote 3.

An information presentation level is a level regarding an amount of presented information requested by viewers. The TV 2 presents various kinds of information corresponding to an information presentation level in cooperation with other TVs 2 constituting the multi-television system 1. Here, the information represents television signals received by the TVs 2 and images or audio based on image/audio signals supplied from other TVs 2. In addition, an image displayed on the TV 2 is constituted by frames at a predetermined frame rate.

For ease of explanation, only images displayed on the TVs 2 will be described below and a description regarding audio is omitted. However, when audio accompanies an image in a television signal or an image/audio signal, the audio is also output from the TV 2 along with the image. Additionally, when an image corresponding to an image signal is transmitted and received, recorded, or played, the operations are simply described as transmission and reception of, recording of, or playback of the image below.

Suppose that the information presentation level can be switched between five steps from a level 1 to a level 5 in this embodiment. At the level 1, the least amount of information is presented to viewers. As the level goes up to the levels 2, 3, 4, and 5, an amount of information presented to the viewers increases.

Viewers watching images displayed on screens of the TVs 2 operate the remote 3, thereby performing various kinds of setting regarding audio and images to be displayed on the TVs 2, such as a channel, a volume, or an information presentation level. The remote 3 transmits signals, corresponding to the various kinds of setting specified by the viewers, to the TVs 2 through infrared communication or the like.

Figure 2:
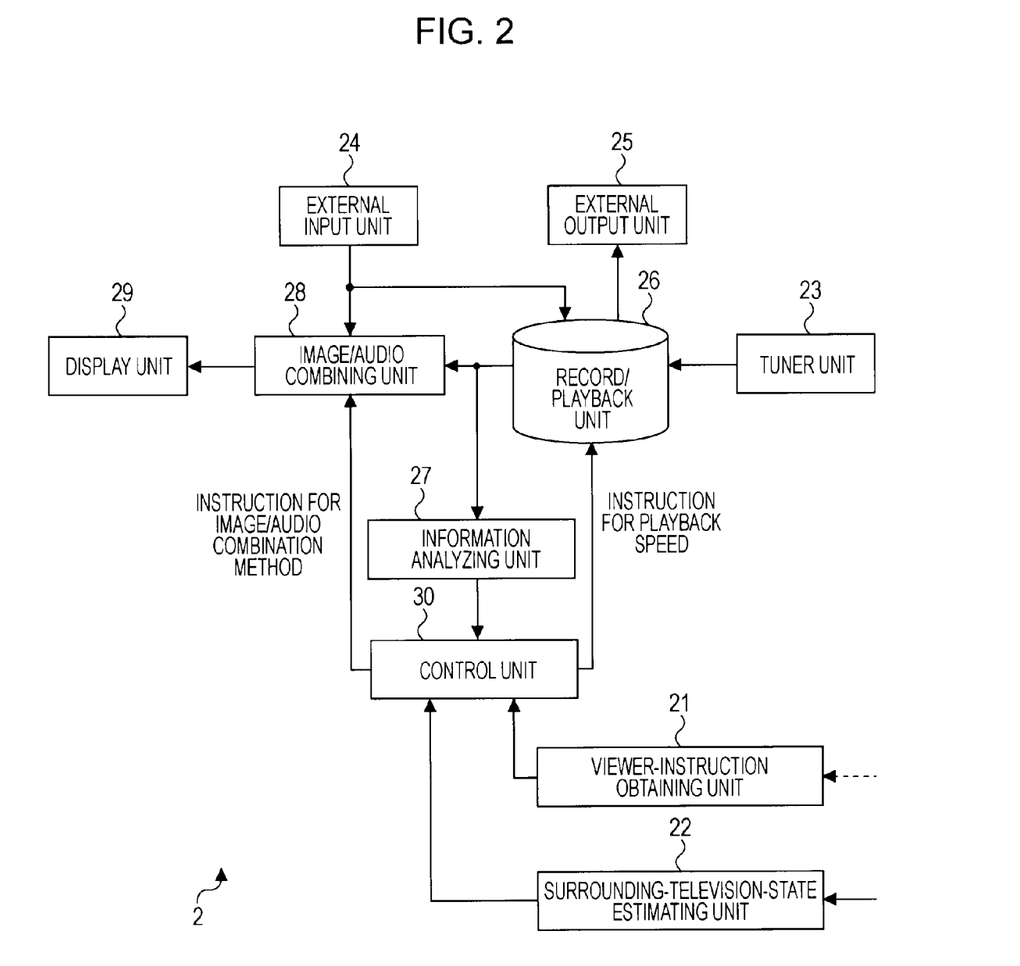
FIG. 2 is a block diagram showing an example of a functional configuration of a television set.

FIG. 2 is a block diagram showing an example of a functional configuration of the television set 2.

The television set 2 includes a viewer-instruction obtaining unit 21, a surrounding-television-state estimating unit 22, a tuner unit 23, an external input unit 24, an external output unit 25, a record/playback unit 26, an information analyzing unit 27, an image/audio combining unit 28, a display unit 29, and a control unit 30.

The viewer-instruction obtaining unit 21 receives contents (commands thereof) instructed by a viewer through operations of the remote 3 and supplies the contents to the control unit 30. For example, the viewer-instruction obtaining unit 21 receives (obtains) an information presentation level specified by the viewer and supplies the information presentation level to the control unit 30.

The surrounding-television-state estimating unit 22 exchanges information regarding connection of the TVs 2 with other TVs 2 through a predetermined cable, such as, for example, an IEEE (Institute of Electrical and Electronics Engineers) 1394 cable, thereby obtaining the number of TVs 2 constituting the multi-television system 1, an arrangement thereof, and a position of this TV 2 in the arrangement of all of the TVs 2 as configuration information. The surrounding-television-state estimating unit 22 supplies the configuration information to the control unit 30. Meanwhile, one TV 2 does not have to be connected to each of the other eight TVs 2 in the multi-television system 1. If the TV 2 is connected to at least one of the other TVs 2, the TV 2 can obtain the configuration information of the whole multi-television system 1 through the connected TV 2.

Under the control of the control unit 30, the tuner unit 23 selects a broadcasting station (channel) and supplies television signals fed from an antenna, not shown, to the record/playback unit 26 after demodulating the signals. Meanwhile, the television signals may be broadcasting signals of terrestrial broadcasting, broadcasting signals of satellite broadcasting such as BS (Broadcasting Satellite) or CS (Communications Satellite), and broadcasting signals of cable television broadcasting. The terrestrial broadcasting signals may be analog or digital. Furthermore, the tuner unit 23 may receive broadcasting signals supplied as network broadcast (stream broadcast) through the Internet or the like.

The external input unit 24 receives images fed from the other TVs 2 and supplies the images to the record/playback unit 26 or the image/audio combining unit 28. Conversely, the external output unit 25 outputs images fed from the record/playback unit 26 in order to supply the images to the other TVs 2.

In response to instructions of the control unit 30, the record/playback unit 26 records images supplied from the tuner unit 23 or from the external input unit 24 on a recording medium, such as a hard disc or a DVD (Digital Versatile Disc), not shown. In addition, in response to instructions of the control unit 30, the record/playback unit 26 plays images recorded on the recording medium and supplies the images to the information analyzing unit 27 or the image/audio combining unit 28. Meanwhile, the record/playback unit 26 can play images recorded on the recording medium at two kinds of speed, e.g., at a standard speed equal to that of the recording (hereinafter, appropriately referred to as a normal speed) and at a speed higher than the standard speed (e.g., the double speed) (hereinafter, appropriately referred to as a high speed).

In accordance with instructions of the control unit 30, the information analyzing unit 27 analyzes images supplied from the record/playback unit 26, extracts important frames that seem to be important to viewers from frames constituting the images, and supplies the important frames to the image/audio combining unit 28 through the control unit 30. The important frames extracted by the information analyzing unit 27 include, for example, frames showing a subtitle of urgent news, frames showing a message board having application addresses of prize competitions and quiz shows, and frames showing exciting scenes.

In accordance with instructions of the control unit 30, the image/audio combining unit 28 supplies the display unit 29 with images fed from the record/playback unit 26 or from the external input unit 24, or important frames fed from the information analyzing unit 27 through the control unit 30 not only to allow the display unit 29 to display the images but also to allow the display unit 29 to display a combined image into which a plurality of images are integrated, if necessary.

The display unit 29 includes a display, such as, for example, a CRT (Cathode Ray Tube) display, an LCD (Liquid Crystal Display), an organic EL (Electro Luminescence) display, or a PDP (Plasma Display Panel). The display unit 29 displays images supplied from the image/audio combining unit 28 on a predetermined screen.

Based on the information presentation level specified by viewers supplied from the viewer-instruction obtaining unit 21 and the configuration information supplied from the surrounding-television-state estimating unit 22, the control unit 30 causes a predetermined image to be displayed on the display unit 29. In addition, the control unit 30 instructs the record/playback unit 26 to record or play images and instructs the image/audio combining unit 28 to or not to combine images. When causing the record/playback unit 26 to play images, the control unit 30 also instructs a playback speed. Additionally, when causing the image/audio combining unit 28 to combine a plurality of images, the control unit 30 also instructs the image/audio combining unit 28 about the combination method. Meanwhile, illustration of control lines from the control unit 30 to each unit is partially omitted in FIG. 2.

The television set 2 configured in the above-described manner is connected to other one or more neighboring television sets 2. According to the information presentation level specified by viewers supplied from the remote 3, each television set 2 displays images based on its position in the arrangement of all of the TVs 2.

Images displayed at each of the information presentation levels from the levels 1 to 5 will be described with reference to FIGS. 3A and 3B to FIGS. 7A and 7B.

FIGS. 3A and 3B to FIGS. 7A and 7B show display examples of the TVs $2_{11}$ to $2_{33}$ when the information presentation levels 1 to 5 are specified, respectively. FIG. 3A, FIG. 4A, FIG. 5A, FIG. 6A, and FIG. 7A are diagrams illustrating images to be displayed on the display unit 29 of the TVs 2, whereas FIG. 3B, FIG. 4B, FIG. 5B, FIG. 6B, and FIG. 7B are diagrams conceptually illustrating the information presentation level specified with the remote 3.

For ease of explanation, it is assumed that images received by the tuner unit 23 of the TVs $2_{11}$, $2_{12}$, $2_{13}$, $2_{21}$, $2_{22}$, $2_{23}$, $2_{31}$, $2_{32}$, and $2_{33}$ and recorded by the corresponding record/playback unit 26 are played back by the record/playback unit 26 of the TVs $2_{11}$, $2_{12}$, $2_{13}$, $2_{21}$, $2_{22}$, $2_{23}$, $2_{31}$, $2_{32}$, and $2_{33}$, respectively, in the below. It is also assumed that images played back by the record/playback unit 26 of the TVs $2_{11}$, $2_{12}$, $2_{13}$, $2_{21}$, $2_{22}$, $2_{23}$, $2_{31}$, $2_{32}$, and $2_{33}$ are appropriately referred to as images of 1 CH (channel), 2 CH, 3 CH, 4 CH, 5 CH, 6 CH, 7 CH, 8 CH, and 9 CH, respectively.

Figure 3A:
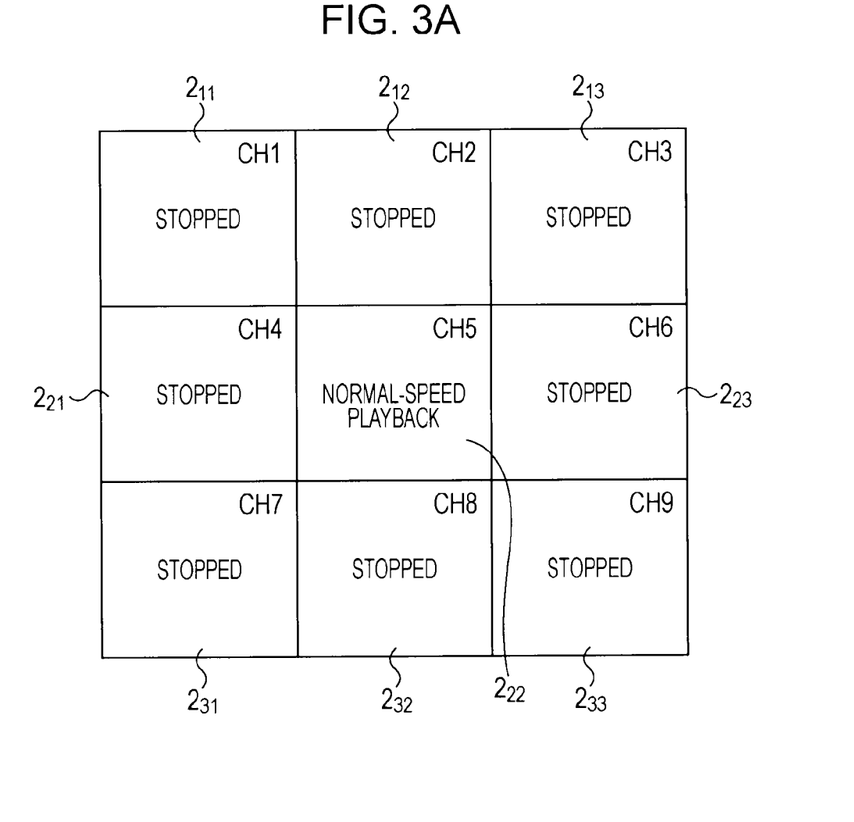
FIGS. 3A and 3B are diagrams illustrating images displayed at an information presentation level 1.
Figure 3B:
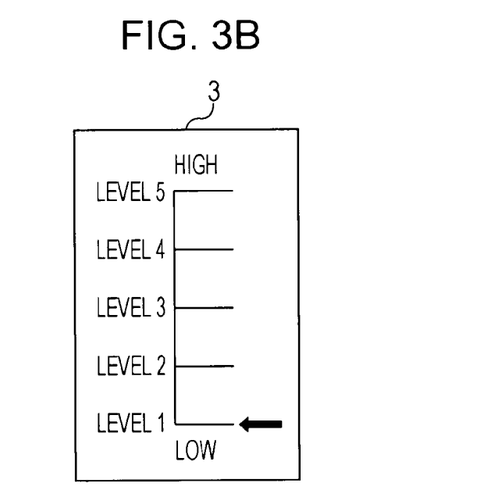

When the information presentation level 1 for the least amount of presented information is specified by a viewer as shown in FIG. 3B, the TVs $2_{11}$ to $2_{33}$ display images as shown in FIG. 3A. More specifically, at the information presentation level 1, the TV $2_{22}$ (hereinafter, appropriately referred to as a central TV 2) located in the center of the TVs $2_{11}$ to $2_{33}$ displays an image of 5 CH played at a normal speed. The other TVs $2_{11}$, $2_{12}$, $2_{13}$, $2_{21}$, $2_{23}$, $2_{31}$, $2_{32}$, and $2_{33}$ (hereinafter, appropriately referred to as surrounding TVs 2) display corresponding images (still images) of 1 CH, 2 CH, 3 CH, 4 CH, 6 CH, 7 CH, 8 CH, and 9 CH displayed when the playback operation is stopped (paused) in response to specification of the information presentation level 1 with the remote 3, respectively.

Since this permits viewers to concentrate only on the image displayed on the central TV 2 and to relax and watch the image, the viewers can pay attention to detailed information in the image of 5 CH or can view the image while relaxing. Since the surrounding TVs 2 other than the central TV 2 are not used substantially, the image of 5 CH may be displayed using all of nine screens of the TVs $2_{11}$ to $2_{33}$ at the information presentation level 1.

Figure 4A:
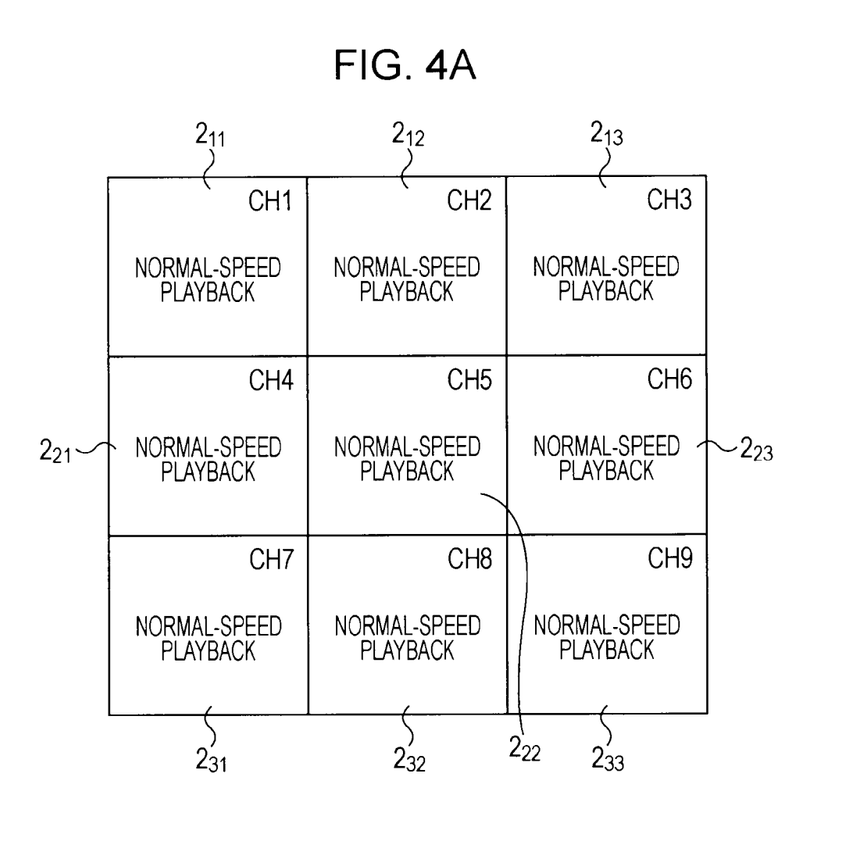
FIGS. 4A and 4B are diagrams illustrating images displayed at an information presentation level 2.

If a viewer operates the remote 3 to change the information presentation level from the level 1 to the level 2 (FIG. 4B), the TVs $2_{11}$ to $2_{33}$ display images shown in FIG. 4A next. More specifically, at the information presentation level 2, the TVs $2_{11}$ to $2_{33}$ display images of 1-9 CHs played at the normal speed, respectively.

Since this permits viewers to watch the images of 1-4 CHs and 6-9 CHs played at the normal speed in addition to the image of 5 CH at the same time, an amount of the presented information increases and a viewer's information acquisition efficiency improves when it is compared with that at the information presentation level 1.

Figure 5A:
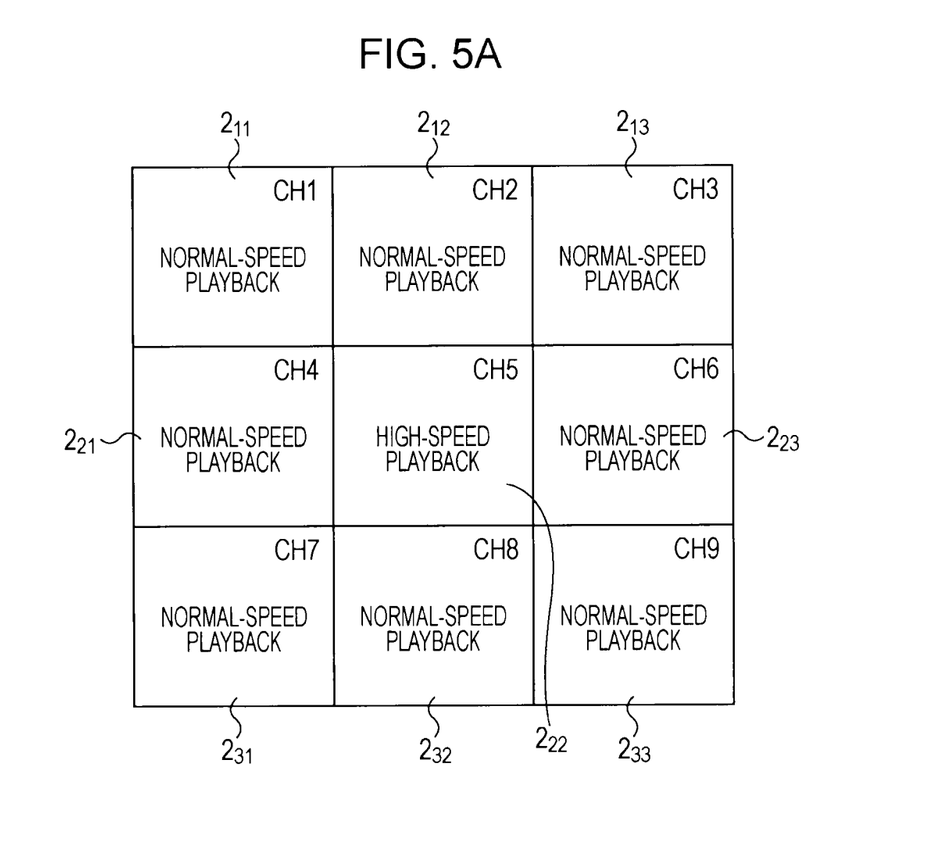
FIGS. 5A and 5B are diagrams illustrating images displayed at an information presentation level 3.

Furthermore, if the viewer changes the information presentation level from the level 2 to the level 3 (FIG. 5B), the surrounding TVs 2 continue to display images of 1-4 CHs and 6-9 CHs played at the normal speed, whereas the central TV 2 displays an image of 5 CH played at a high speed as shown in FIG. 5A.

This increases density (information density) of information presented by the central TV 2 than that at the information presentation level 2 and the viewer's information acquisition efficiency further improves at the information presentation level 3.

Figure 6A:
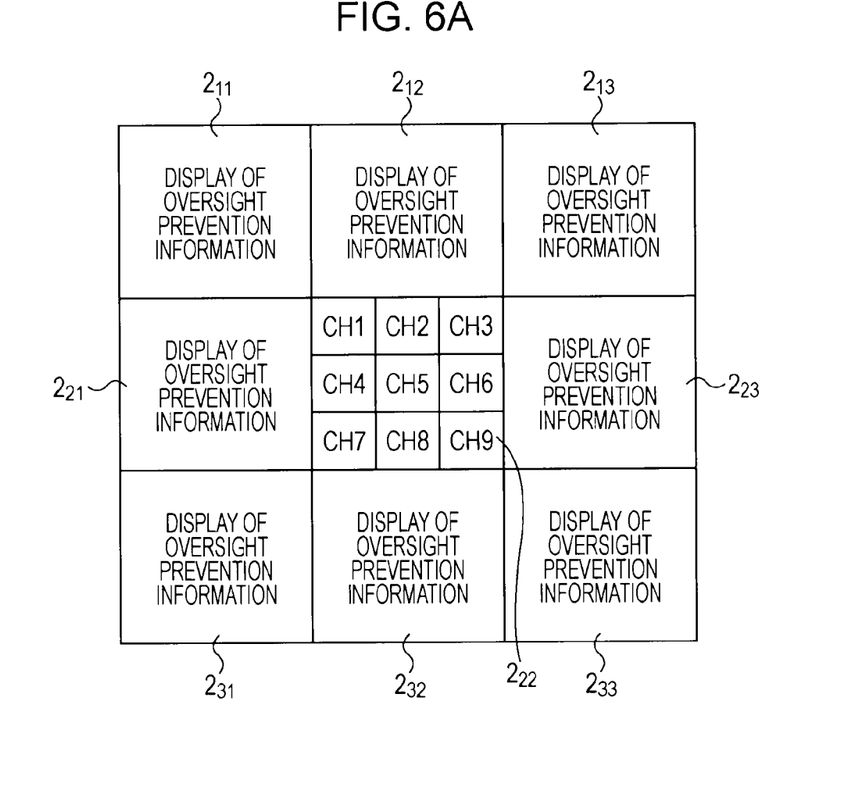
FIGS. 6A and 6B are diagrams illustrating images displayed at an information presentation level 4.

If the information presentation level 4 is specified (FIG. 6B), a combined image, into which images of 1-9 CHs played at the high speed by the corresponding record/playback unit 26 of the TVs $2_{11}$ to $2_{33}$ are integrated, is displayed on a divided screen. The divided screen is the screen of the central TV 2 divided into 3×3, i.e., nine, as shown in FIG. 6A.

On the other hand, the surrounding TVs 2 display oversight prevention information. More specifically, the TVs $2_{11}$ to $2_{21}$ and $2_{23}$ to $2_{33}$ display important frames extracted by the corresponding information analyzing unit 27 of the TVs $2_{11}$ to $2_{21}$ and $2_{23}$ to $2_{33}$.

Although an amount of the presented information decreases in a spatial direction at the information presentation level 4, viewers can watch images of 1-9 CHs only using the central TV 2. Furthermore, since important information not to be overlooked is displayed on the surrounding TVs 2 as important frames, the amount of the presented information increases.

Figure 7A:
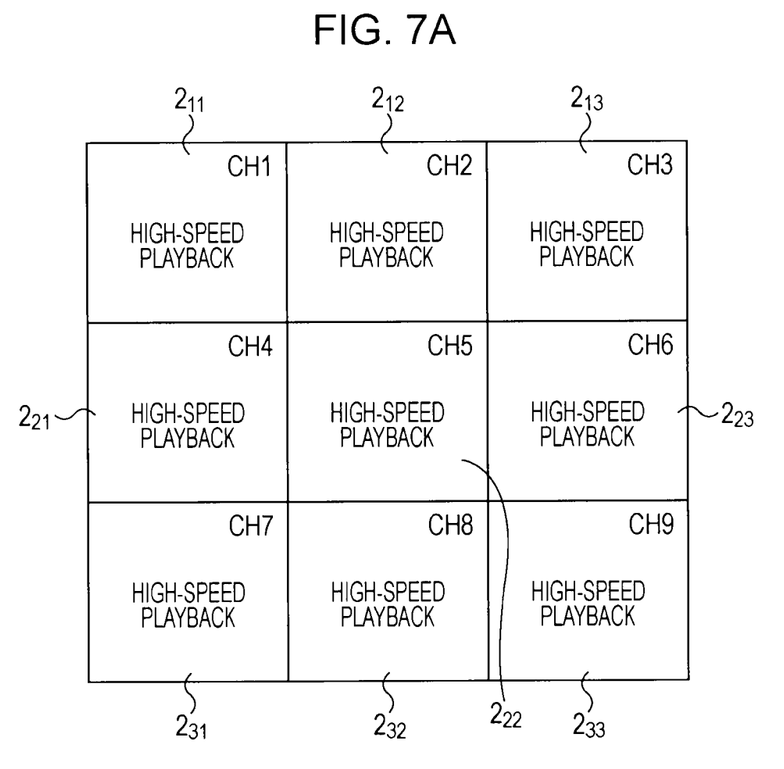
FIGS. 7A and 7B are diagrams illustrating images displayed at an information presentation level 5.

If the information presentation level 5 is specified (FIG. 7B), the TVs $2_{11}$ to $2_{33}$ display images of 1-9 CHs played at the high speed as shown in FIG. 7A. Since an amount of information of each image of 1-9 CHs is larger at the information presentation level 5 than at the information presentation level 4, viewers are less likely to overlook the information. Thus, the viewer's information acquisition efficiency improves than that at the information presentation level 4.

A display control operation performed by the TV 2 will be described next with reference to a flowchart shown in FIG. 8. This operation starts when a viewer performs an operation for specifying a predetermined information presentation level on the remote 3 and the remote 3 transmits a command indicating the information presentation level to the TV 2.

First, at STEP S11, the viewer-instruction obtaining unit 21 receives the command indicating the information presentation level and supplies the command to the control unit 30.

At STEP S12, the control unit 30 obtains the command from the viewer-instruction obtaining unit 21 and determines whether the information presentation level specified by the viewer has been changed.

If it is determined that the information presentation level specified by the viewer has been changed at STEP S12, i.e., if the currently set information presentation level differs from the information presentation level transmitted from the remote 3, the process proceeds to STEP S13. On the other hand, if it is determined that the information presentation level specified by the viewer has not been changed at STEP S12, the display control operation ends.

At STEP S13, the control unit 30 determines the information presentation level specified by the viewer. If the specified information level is determined to be the levels 1, 2, 3, 4, and 5, the process proceeds to STEPs S14, S15, S16, S17, and S18, respectively.

At STEP S14 corresponding to the information presentation level 1, the control unit 30 executes a display control operation for the level 1 (hereinafter, referred to as a level 1 display control operation) to cause the display unit 29 to display the images of the information presentation level 1, which has been described with reference to FIGS. 3A and 3B. The control unit 30 then terminates the operation.

Figure 4B:
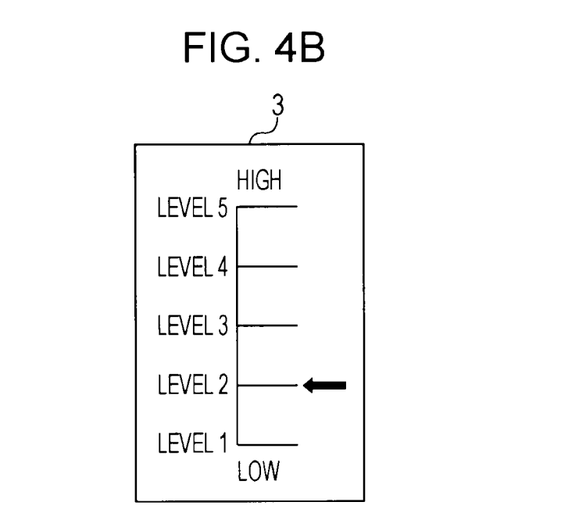

At STEP S15 corresponding to the information presentation level 2, the control unit 30 executes a display control operation for the level 2 (hereinafter, referred to as a level 2 display control operation) to cause the display unit 29 to display the images of the information presentation level 2, which has been described with reference to FIGS. 4A and 4B. The control unit 30 then terminates the operation.

Figure 5B:
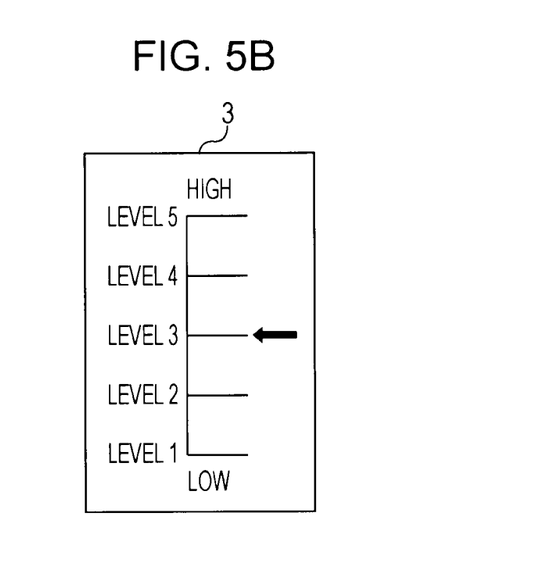

At STEP S16 corresponding to the information presentation level 3, the control unit 30 executes a display control operation for the level 3 (hereinafter, referred to as a level 3 display control operation) to cause the display unit 29 to display the images of the information presentation level 3, which has been described with reference to FIGS. 5A and 5B. The control unit 30 then terminates the operation.

Figure 6B:
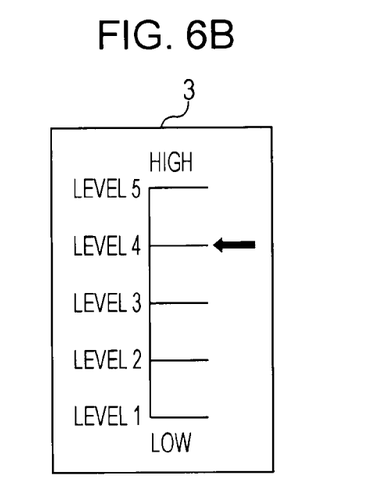

At STEP S17 corresponding to the information presentation level 4, the control unit 30 executes a display control operation for the level 4 (hereinafter, referred to as a level 4 display control operation) to cause the display unit 29 to display the images of the information presentation level 4, which has been described with reference to FIGS. 6A and 6B. The control unit 30 then terminates the operation.

Figure 7B:
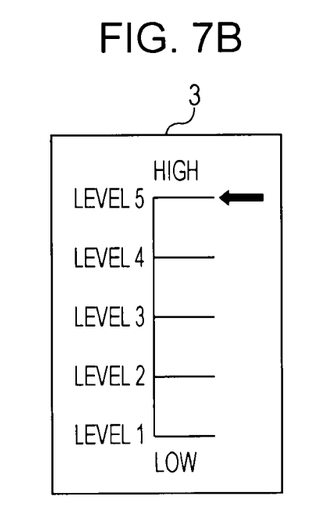

At STEP S18 corresponding to the information presentation level 5, the control unit 30 executes a display control operation for the level 5 (hereinafter, referred to as a level 5 display control operation) to cause the display unit 29 to display the images of the information presentation level 5, which has been described with reference to FIGS. 7A and 7B. The control unit 30 then terminates the operation.

Details of each of the operations for displaying the images of the information presentation levels 1 to 5 performed at STEPs S14 to S18 will be described later with reference to FIGS. 9 to 13.

Figure 8:
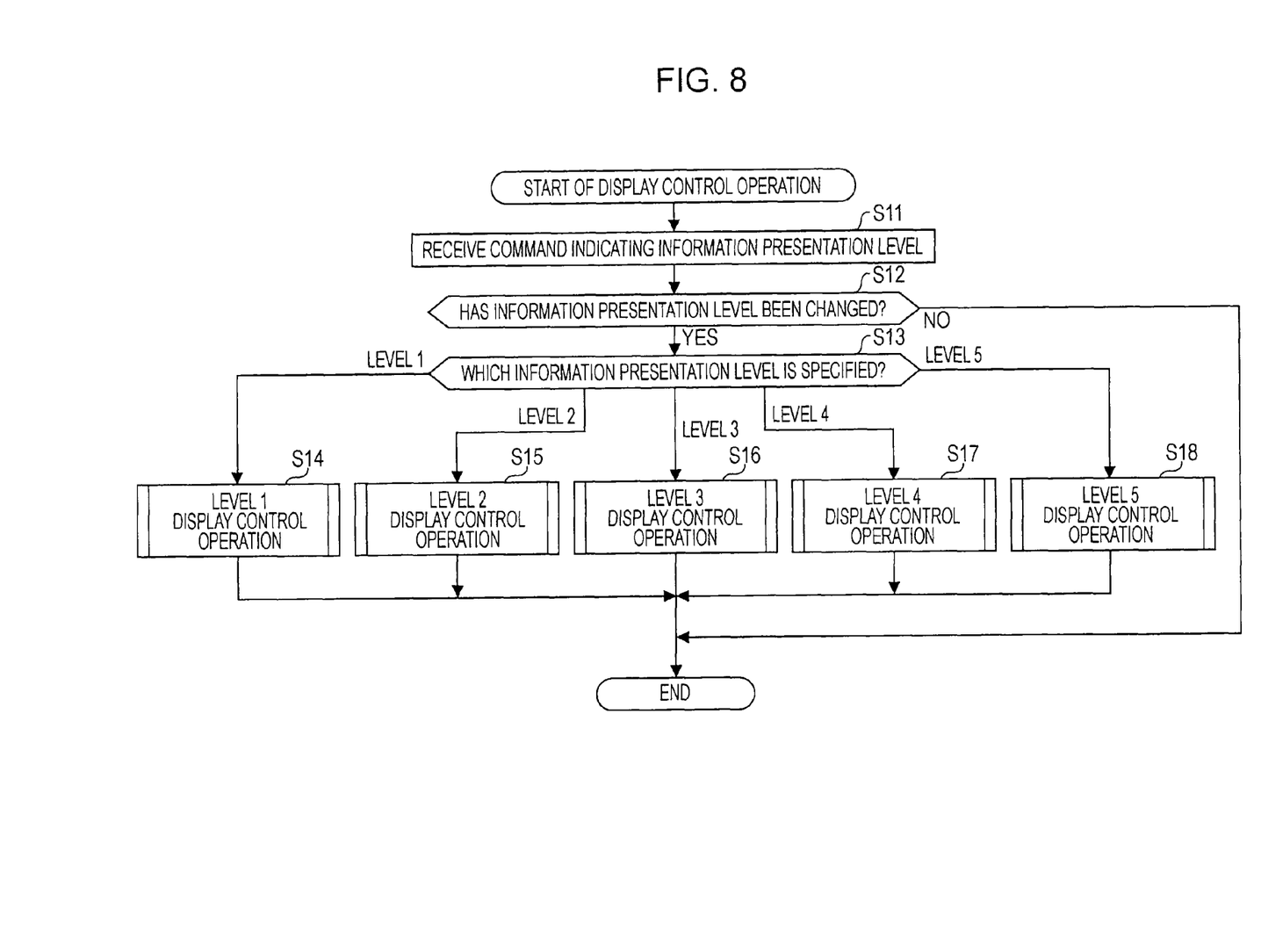
FIG. 8 is a flowchart illustrating a display control operation performed by a multi-television system.

Since the display control operation shown in FIG. 8 is restarted in response to next transmission of a command indicating a predetermined information presentation level from the remote 3 to the TV 2, the images displayed at the currently set information presentation level are continuously displayed until a command of an information presentation level different from the currently set information presentation level is transmitted next.

Figure 9:
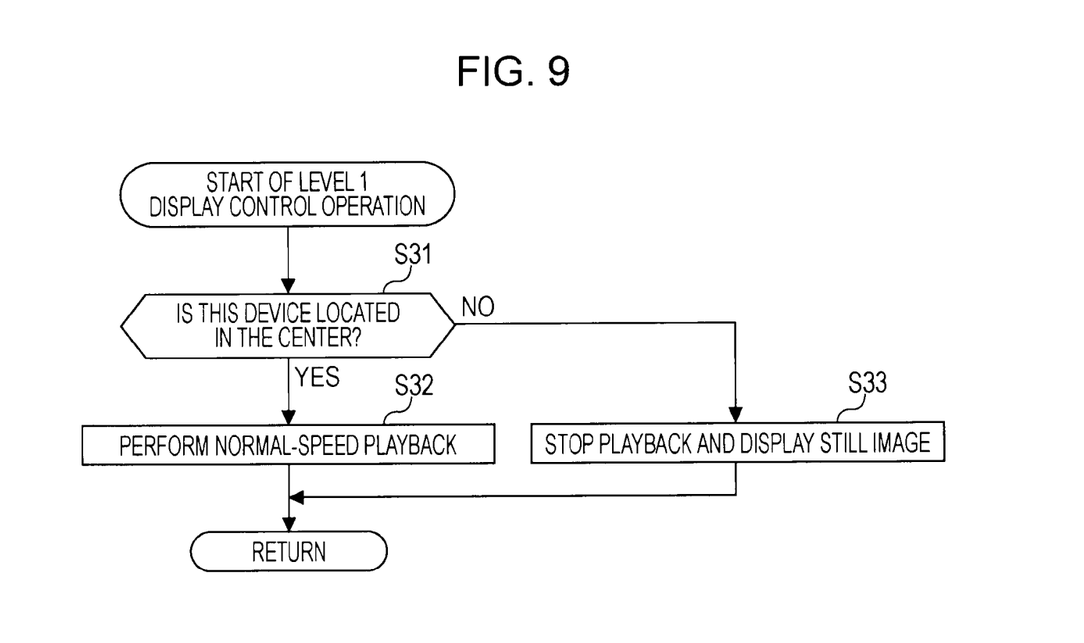
FIG. 9 is a flowchart illustrating a level 1 display control operation.

FIG. 9 shows a flowchart of the level 1 display control operation performed at STEP S14 shown in FIG. 8.

First, at STEP S31, the control unit 30 determines whether this TV is located in the center, i.e., whether this TV (TV 2) is the central TV 2, on the basis of the configuration information supplied from the surrounding-television-state estimating unit 22.

If this TV is determined to be located in the center at STEP S31, the process proceeds to STEP S32. At STEP S32, the control unit 30 causes the record/playback unit 26 to play, at the normal speed, a predetermined image recorded on a recording medium. In addition, at STEP S32, the control unit 30 controls the image/audio combining unit 28 so that the image supplied from the record/playback unit 26 is displayed on the display unit 29.

On the other hand, if this TV is determined not to be located in the center at STEP S31, the control unit 30 stops the playback operation performed by the record/playback unit 26 and pauses the display of the display unit 29 at STEP S33. More specifically, the control unit 30 supplies an instruction for stopping the playback operation to the record/playback unit 26 and supplies an instruction for pausing the display to the image/audio combining unit 28. In response to the instruction for pausing the display, the image/audio combining unit 28 causes the display unit 29 to continuously display an image (still image) displayed at the time when the instruction is supplied.

As a result, in the whole multi-television system 1, the TV $2_{22}$ located in the center displays the image of 5 CH played at the normal speed and the other TVs $2_{11}$, $2_{12}$, $2_{13}$, $2_{21}$, $2_{23}$, $2_{31}$, $2_{32}$, and $2_{33}$ display the image images (still images) of 1 CH, 2 CH, 3 CH, 4 CH, 6 CH, 7 CH, 8 CH, and 9 CH displayed at the time when the playback operation is stopped (paused) in response to specification of the information presentation level 1 with the remote 3, respectively, as shown in FIG. 3A.

If the TVs $2_{11}$, $2_{12}$, $2_{13}$, $2_{21}$, $2_{23}$, $2_{31}$, $2_{32}$, and $2_{33}$ other than the TV $2_{22}$ located in the center are not playing and displaying images before the information presentation level 1 is specified, no images are displayed on the display unit 29.

Figure 10:
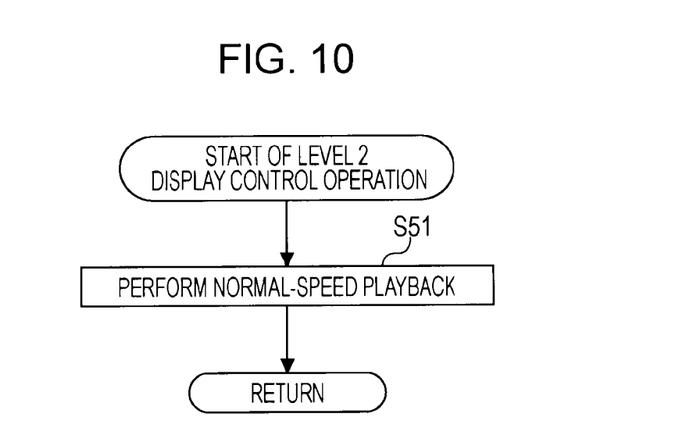
FIG. 10 is a flowchart illustrating a level 2 display control operation.

The level 2 display control operation performed at STEP S15 shown in FIG. 8 will be described next with reference to a flowchart shown in FIG. 10.

In the level 2 display control operation, the control unit 30 controls the record/playback unit 26 to play, at a normal speed, a predetermined image recorded on a recording medium and also controls the image/audio combining unit 28 to cause the display unit 29 to display the image supplied from the record/playback unit 26 at STEP S51. The process then returns to the display control operation shown in FIG. 8.

As a result, in the whole multi-television system 1, the TVs $2_{11}$ to $2_{33}$ display images of 1-9 CHs played at the normal speed, respectively, as shown in FIG. 4A.

Figure 11:
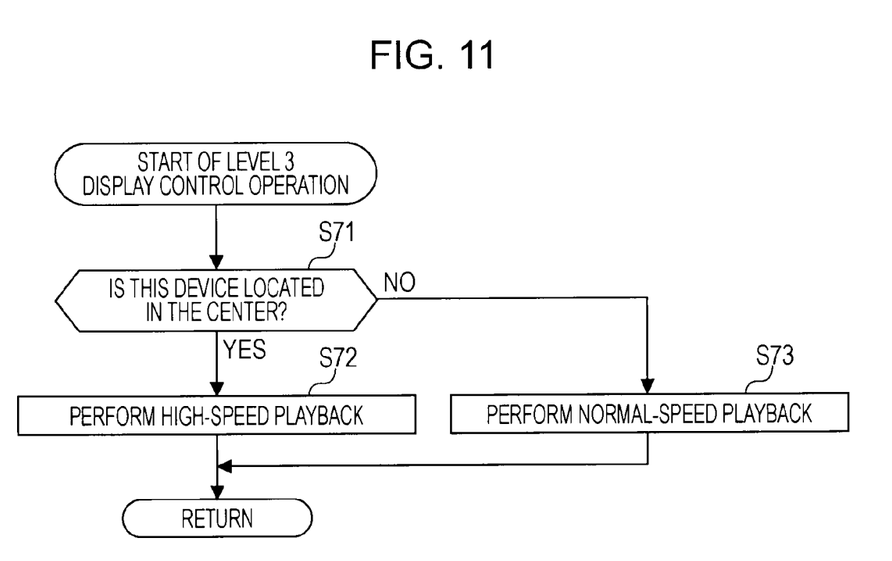
FIG. 11 is a flowchart illustrating a level 3 display control operation.

FIG. 11 shows a flowchart of the level 3 display control operation performed at the STEP S16 shown in FIG. 8.

First, at STEP S71, the control unit 30 determines whether this TV is located in the center, i.e., whether this TV (TV 2) is the central TV 2, on the basis of the configuration information supplied from the surrounding-television-state estimating unit 22.

If this TV is determined to be located in the center at STEP S71, the process proceeds to STEP S72. At STEP S72, the control unit 30 causes the record/playback unit 26 to play, at the high speed, a predetermined image recorded on a recording medium. In addition, at STEP S72, the control unit 30 controls the image/audio combining unit 28 so that the image supplied from the record/playback unit 26 is displayed on the display unit 29.

On the other hand, if this TV is determined not to be located in the center at STEP S71, the control unit 30 causes the record/playback unit 26 to play, at the normal speed, a predetermined image recorded on a recording medium at STEP S73. In addition, at STEP S73, the control unit 30 controls the image/audio combining unit 28 so that the image supplied from the record/playback unit 26 is displayed on the display unit 29.

As a result, in the whole multi-television system 1, the TV $2_{22}$ located in the center displays the image of 5 CH played at the high speed and the other TVs $2_{11}$, $2_{12}$, $2_{13}$, $2_{21}$, $2_{23}$, $2_{31}$, $2_{32}$, and $2_{33}$ display the images of 1 CH, 2 CH, 3 CH, 4 CH, 6 CH, 7 CH, 8 CH, and 9 CH played at the normal speed, respectively, as shown in FIG. 5A.

Figure 12:
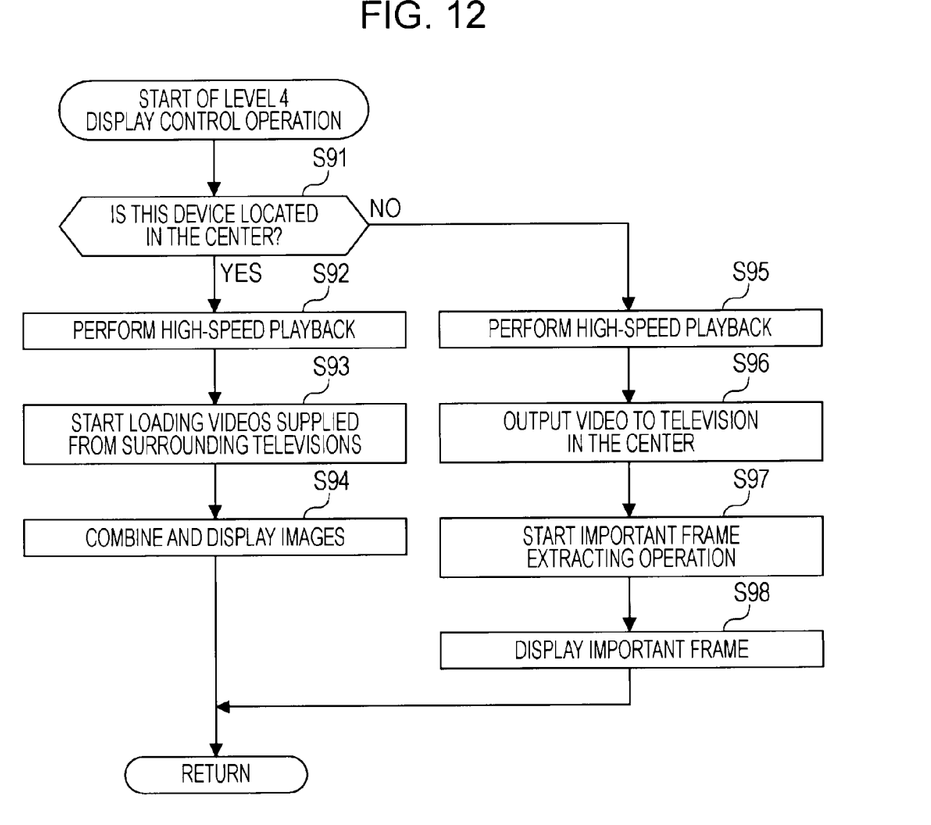
FIG. 12 is a flowchart illustrating a level 4 display control operation.

FIG. 12 shows a flowchart of the level 4 display control operation performed at STEP S17 shown in FIG. 8.

First, at STEP S91, the control unit 30 determines whether this TV is located in the center, i.e., whether this TV (TV 2) is the central TV 2, on the basis of the configuration information supplied from the surrounding-television-state estimating unit 22.

If this TV is determined to be located in the center at STEP S91, the process proceeds to STEP S92. At STEP S92, the control unit 30 causes the record/playback unit 26 to play, at the high speed, a predetermined image recorded on a recording medium.

At STEP S93, the external input unit 24 starts loading images supplied from the connected surrounding TVs 2. This allows images of 1 CH, 2 CH, 3 CH, 4 CH, 6 CH, 7 CH, 8 CH, and 9 CH played back at the high speed in the TVs $2_{11}$, $2_{12}$, $2_{13}$, $2_{21}$, $2_{23}$, $2_{31}$, $2_{32}$, and $2_{33}$ to be supplied to the image/audio combining unit 28.

At STEP S94, the control unit 30 causes the image/audio combining unit 28 to combine the image of 5 CH supplied from the record/playback unit 26 and the images of 1-4 CHs and 6-9 CHs supplied from the external input unit 24 and causes the display unit 29 to display the combined image.

On the other hand, if this TV is determined not to be located in the center at STEP S91, the control unit 30 causes the record/playback unit 26 to play, at the high speed, a predetermined image recorded on a recording medium and to supply the image played back at the high speed to the external output unit 25 and the information analyzing unit 27 at STEP S95.

At STEP S96, the external output unit 25 outputs, to the central TV 2, the image supplied from the record/playback unit 26. Meanwhile, if the surrounding TV 2 is not directly connected to the central TV 2, the image may be supplied to the central TV 2 through the other surrounding TVs 2.

At STEP S97, the control unit 30 causes the information analyzing unit 27 to start extracting important frames. The extracted important frames are supplied to the control unit 30.

At STEP S98, the control unit 30 causes the display unit 29 to display the important frames. More specifically, the control unit 30 supplies the important frames fed from the information analyzing unit 27 to the image/audio combining unit 28 and causes the display unit 29 to display the important frames.

As a result, in the whole multi-television system 1, the TV $2_{22}$ located in the center displays a combined image, into which the images of 1-9 CHs played back at the high speed by the corresponding record/playback unit 26 of the TVs $2_{11}$ to $2_{33}$ are integrated, and the TVs $2_{11}$ to $2_{21}$ and $2_{23}$ to $2_{33}$ display the important frames extracted by the information analyzing unit 27 thereof, as shown in FIG. 6A.

Meanwhile, a circumstance where many important frames are extracted in one TV 2 and few important frames are extracted in another TV 2 is possible. Accordingly, instead of displaying important frames extracted in each TV 2 on the display unit 29 thereof, the important frames extracted in each TV 2 may be sequentially displayed on the display unit 29 of every surrounding TV 2. Alternatively, a surrounding TV 2 displaying the oldest important frame among the important frames displayed on the display unit 29 of each surrounding TV 2 may be retrieved and the important frames may be displayed on the retrieved display unit 29. More specifically, the surrounding TV having charge of displaying of important frames may cooperate with each other to display the important frames.

Figure 13:
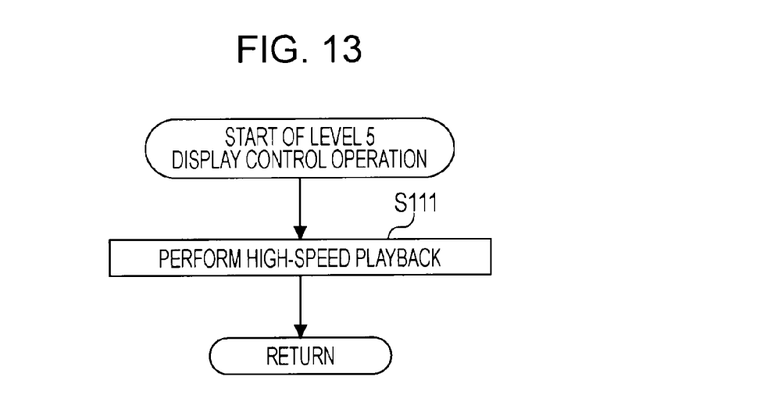
FIG. 13 is a flowchart illustrating a level 5 display control operation.

The level 5 display control operation performed at STEP S18 shown in FIG. 8 will be described next with reference to a flowchart shown in FIG. 13.

In the level 5 display control operation, the control unit 30 controls the record/playback unit 26 to play, at the high speed, a predetermined image recorded on a recording medium and also controls the image/audio combining unit 28 to cause the display unit 29 to display the image supplied from the record/ playback unit 26 at STEP S111. The process then returns to the display control operation shown in FIG. 8.

As a result, in the whole multi-television system 1, the TVs $2_{11}$ to $2_{33}$ display images of 1-9 CHs played at the high speed, respectively, as shown in FIG. 7A.

As described above, in the multi-television system 1 shown in FIG. 1, the amount of presented information can be changed according to capabilities of viewers receiving the information by switching the display states of TVs $2_{11}$ to $2_{33}$ between five steps where the amount of the presented information differs. More specifically, the amount of the presented information is changed by altering the number of images to be displayed on the display unit 29, a playback speed, ON/OFF of an important frame extracting function (a degree of information understanding assistance), the number of presenting screens, or the size of the images according to the information presentation level specified by viewers.

This allows high-density information to be presented to viewers demanding such information and a sufficient amount of information (images) corresponding to the information presentation level of the viewers to be presented.

Although the playback speed of images is divided into two steps, the normal-speed playback (standard playback) and the high-speed playback, in the above-described examples, the steps of the playback speed may be low-speed playback and the normal-speed playback. Furthermore, the playback speed may be divided into three or more steps.

Additionally, in the case of simultaneously displaying images played at different playback speeds, viewers can specify the playback speeds by previously setting the playback speeds on a setting screen or the like or by instructing the playback speeds through operations of the remote 3 or the like during the playback and displaying of the images.

Although the central TV 2, among the nine TVs $2_{11}$ to $2_{33}$ arranged in a 3×3 matrix, displays an image played at a normal speed at the above-described information presentation level 1, the surrounding TV 2 may display the image played at the normal speed. More specifically, any TV 2 among the nine TVs may be employable as long as the TV 2 for displaying the image played back at the normal speed is decided at the information presentation level 1. The same applies to the information presentation level 3 or 4.

Furthermore, a television set 2, which is a display device including a tuner unit 23 therein, has the record/playback unit 26 for recording or playing images on a predetermined recording medium in the above-described examples. However, the display function and the record/playback function can be constituted as separate devices. More specifically, a display device for displaying input images and a record/playback device for recording images on a predetermined recording medium and for playing the images recorded on the recording medium may be made to correspond to each other and nine of these pairs may be connected to each other to constitute the multi-television system 1.

Alternatively, images displayed on the nine display units 29 in the above-described examples may be displayed on one display device as a one-screen combined image and the multi-television system 1 may be constituted by one display device and nine record/playback devices.

Furthermore, the use of a record/playback device that includes a plurality of recording media and that simultaneously records or plays nine kinds of images permits the multi-television system 1 to be constituted by one display device and one record/playback device and the above-described display control operations to be performed.

The above-described series of operations can be executed by hardware or software. When the series of operations are executed by software, programs constituting the software are installed, from a program-recording medium, in a computer embedded in dedicated hardware or in, for example, a general-purpose personal computer capable of executing various functions by installing various kinds of programs.

Figure 14:
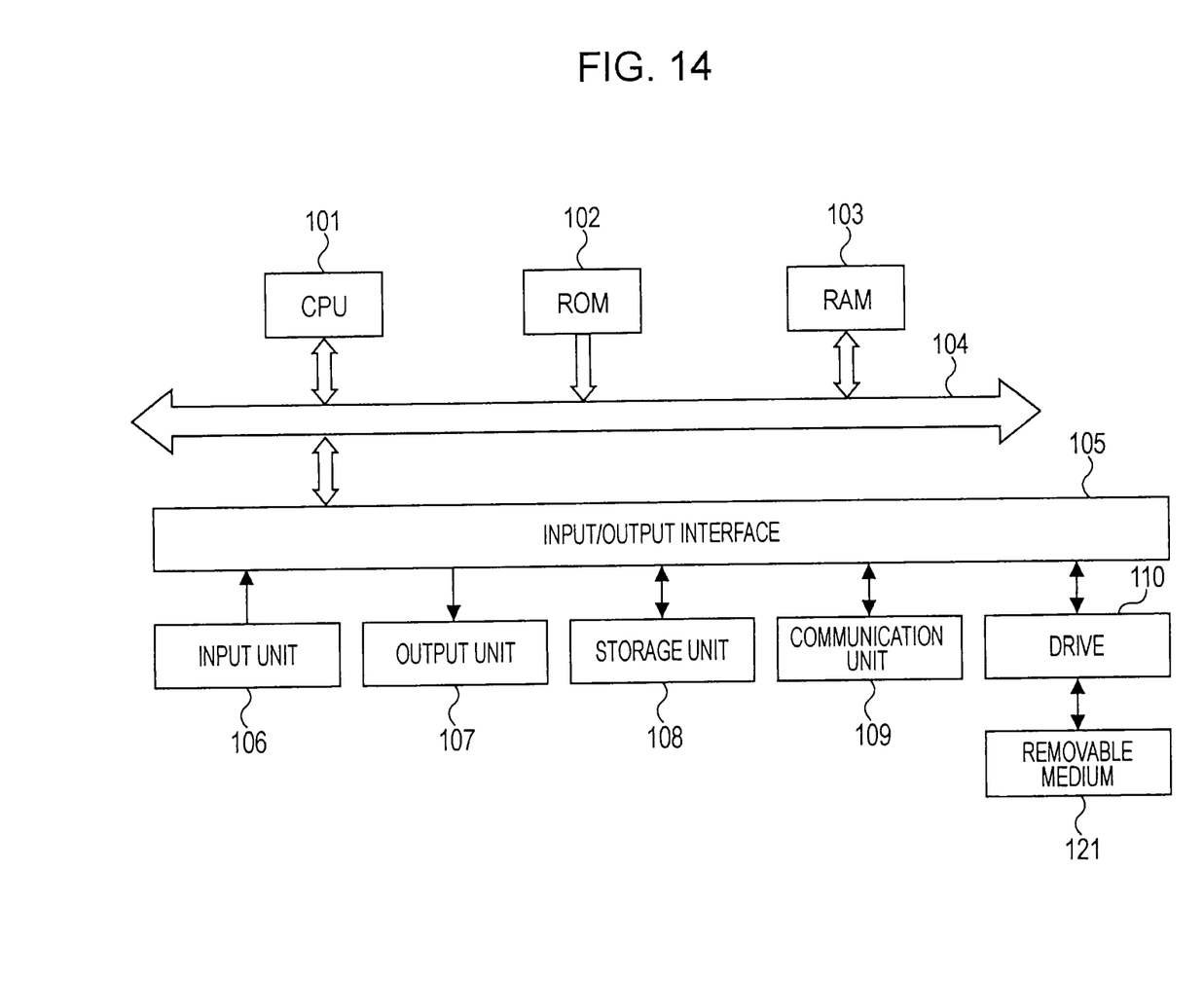
FIG. 14 is a block diagram showing an example of a configuration of a computer according to an embodiment of the present invention.

FIG. 14 is a block diagram showing an example of a hardware configuration of a computer that executes the above-described series of operations through programs.

In the computer, a CPU (Central Processing Unit) 101, a ROM (Read Only Memory) 102, and a RAM (Random Access Memory) 103 are connected to each other through a bus 104.

Furthermore, an input/output interface 105 is connected to the bus 104. An input unit 106 including a keyboard, a mouse, and a microphone, an output unit 107 including a display and a speaker, a storage unit 108 including a hard disc and a nonvolatile memory, a communication unit 109 including a network interface, and a drive 110 for driving a removable medium 121, such as a magnetic disc, an optical disc, a magneto-optical disc, or a semiconductor memory, are connected to the input/output interface 105.

In the computer configured in the above-described manner, the CPU 101 loads programs stored, for example, in the storage unit 108 to the RAM 103 through the input/output interface 105 and the bus 104 and executes the programs, thereby performing the above-described series of operations.

The programs to be executed by the computer (the CPU 101) may be supplied after being recorded on a removable medium 121, which is a package medium constituted by, for example, a magnetic disc (including a flexible disc), an optical disc (a CD-ROM (Compact Disc-Read Only Memory), a DVD (Digital Versatile Disc), etc.), an magneto-optical disc, or a semiconductor memory, or through wired or wireless communication media, such as a local area network, the Internet, and digital satellite broadcasting.

By inserting the removable medium 121 into the drive 110, the programs can be installed in the storage unit 108 through the input/output interface 105. The programs can also be received by the communication unit 109 through wired or wireless communication media and can be installed in the storage unit 108. In addition, the programs can be preinstalled on the ROM 102 or in the storage unit 108.

Meanwhile, the programs executed by the computer may be processed chronologically in the order described herein or may be processed in parallel or at necessary timings, such as when the programs are called.

In addition, steps described in the flowcharts in this specification include processing that is executed sequentially in the described order, and also includes processing that is executed in parallel or individually, not necessarily sequentially.

Embodiments of the present invention are not limited to the embodiments described above and various modifications can be made within a scope not departing from the spirit of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing system for simultaneously displaying images, comprising:
   obtaining means for obtaining an information presentation level specified by a viewer;
   playback means for simultaneously playing, at a predetermined playback speed, a plurality of the images recorded on a predetermined recording medium as an array of images including a central image and a plurality of surrounding images; and display control means for changing, in accordance with the information presentation level, a playback speed of at least one of the central image or the plurality of surrounding images, the playback speed of the central image being controlled independently of the playback speed of the surrounding images.

2. The image processing system according to claim 1, wherein the display control means changes the playback speed of the simultaneously displayed images according to the information presentation level, each of the simultaneously displayed images being displayed at a different playback speed.

3. The image processing system according to claim 1, further comprising:
one or more display means, and a number of the display means corresponds to the number of the images displayed.

4. The image processing system according to claim 1, further comprising:
combining means for combining the one or more images.

5. The image processing system according to claim 1, further comprising:
extracting means for extracting one or more important frames of the images played by the playback means.

6. The image processing system according to claim 5, wherein the display control means causes the predetermined display means to simultaneously display the one or more important frames extracted by the extracting means.

7. The image processing system according to claim 5, wherein the important frames include frames having subtitles of urgent news, frames including application address of prize competitions and frames showing exciting scenes.

8. The image processing system according to claim 1, wherein the display control means changes a size of the images, or existence or nonexistence of extraction of important frames of the images according to the information presentation level.

9. The image processing system according to claim 8, wherein one image that is played at a standard speed is displayed at a predetermined information presentation level.

10. The image processing system according to claim 8, wherein a plurality of images that are played at a standard speed are simultaneously displayed at a predetermined information presentation level.

11. The image processing system according to claim 8, wherein an image that is played at a high speed and one or more images that are played at a standard speed are simultaneously displayed at a predetermined information presentation level.

12. The image processing system according to claim 8, wherein a plurality of images that are played at a high speed and important frames of the images are simultaneously displayed at a predetermined information presentation level.

13. The image processing system according to claim 8, wherein a plurality of images that are played at a high speed are simultaneously displayed at a predetermined information presentation level.

14. An information processing method for an information processing system that performs processing for simultaneously displaying images, the method comprising:
obtaining an information presentation level specified by a viewer; and
changing, in accordance with the information presentation level, a playback speed of at least one of a central image displayed or a plurality of surrounding images displayed on predetermined display means by simultaneously playing, at a predetermined playback speed, a plurality of the images recorded on a predetermined recording medium as an array of images including the central image and the plurality of surrounding images, the playback speed of the central image being controlled independently of the playback speed of the surrounding images.

15. A non-transitory computer-readable medium storing computer-readable instructions thereon, the computer readable instructions when executed by a computer cause the computer to perform a method comprising:
obtaining an information presentation level specified by a viewer; and
changing, in accordance with the information presentation level, a playback speed of at least one of a central image displayed or a plurality of surrounding images displayed on predetermined display means by simultaneously playing, at a predetermined playback speed, a plurality of the images recorded on a predetermined recording medium as an array of images including the central image and the plurality of surrounding images, the playback speed of the central image being controlled independently of the playback speed of the surrounding images.

16. An image processing system for simultaneously displaying images, comprising:
an obtaining unit configured to obtain an information presentation level specified by a viewer;
a playback unit configured to simultaneously play, at a predetermined playback speed, a plurality of the images recorded on a predetermined recording medium as an array of images including a central image and a plurality of surrounding images; and
a display control unit configured to change, in accordance with the information presentation level, a playback speed of at least one of the central image or the plurality of surrounding images, the playback speed of the central image being controlled independently of the playback speed of the surrounding images.

* * * * *